United States Patent Office.

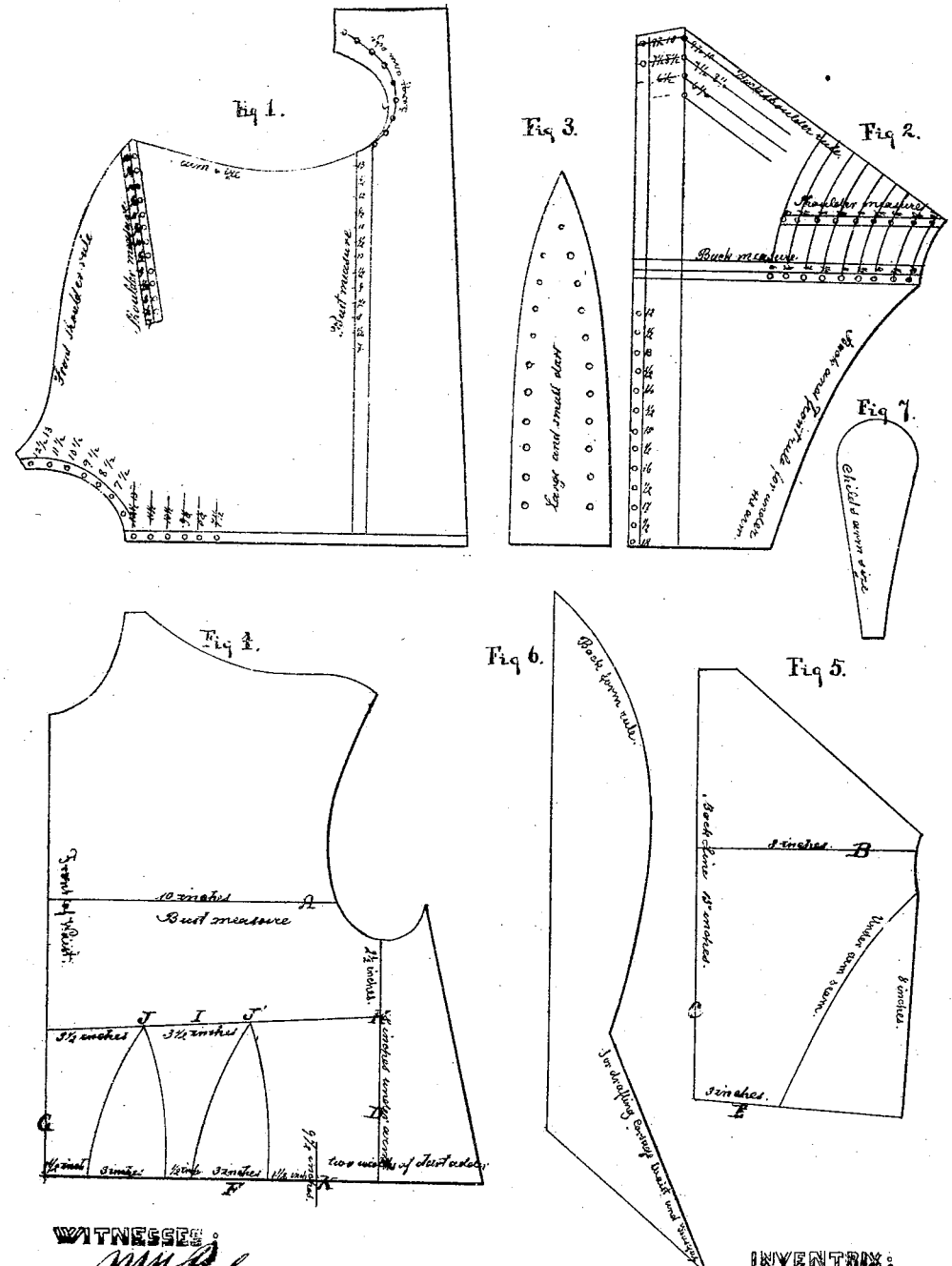

FANNIE WETMORE, OF CHICAGO, ILLINOIS.

Letters Patent No. 110,097, dated December 13, 1870.

IMPROVEMENT IN PATTERNS FOR MEASURING AND LAYING OUT GARMENTS.

The Schedule referred to in these Letters Patent and making part of the same.

I, Mrs. FANNIE WETMORE, of Chicago, in the county of Cook and State of Illinois, have invented certain Improvements in Patterns for Measuring and Laying out Garments, of which the following is a specification.

I employ patterns or forms marked or printed upon paper, or cut in pasteboard or metal, of a peculiar form, as will appear.

These patterns have certain rule or guide-lines, and also graduated lines marked with figures to correspond one with another at various points in the pattern.

Measurements are taken upon the person and a pattern cut by the model or form, as will be hereinafter more fully explained.

In the accompanying drawing—

Figure 1 is the model for the front of the waist or body.

Figure 2 is the model for the back of the waist or body.

Figure 3 is the model for the large and small darts.

Figure 4 is a diagram showing the manner of cutting the front of the waist or body.

Figure 5 is a diagram showing the manner of cutting the back of the waist or body.

Figure 6 is the model for the back form rule, and for drafting corsage waist and basque.

Figure 7 is the model for child's arm size.

The following is my process of measuring and drafting, so fully, clearly, and exactly explained as to enable others skilled in the art to use the same.

First, raise the arm level with the shoulder, then place an ordinary tape-measure at the center of the bust, and measure straight to the arm. This I term the bust measure.

Second, measure straight across the back from arm to arm; take one-half of this measure and it will be what I term the back measure.

Third, place the tape at the center of the back of the neck and measure to the bottom of the waist. This is what I term the length of back measure.

Fourth, place the tape close under the arm and measure to the bottom of the waist. This is what I term the under-arm seam measure.

Fifth, draw the tape tight around the waist for the waist measure, then take one-half of this and subtract two and one-half to three inches (owing to size of person,) for the back, and the remainder will be what I term the front of waist measure.

Sixth, to cut the dress, place the model of the part to be cut upon the lining, and mark each corresponding number at the several graduated scales, after which cut according to the following example:

Example for Drafting and Cutting.

First, let the bust measure be, say ten inches, as is represented at the line A in the diagram, fig. 4.

Second, let the back measure be, say sixteen inches; divide this by two, and we have eight inches as back measure, as is represented at the line B, fig. 5.

Third, let the length of back measure be, say fifteen inches, as at the line C.

Fourth, let the under-arm measure be, say eight inches, as at the line D.

Fifth, let the measure around the waist be, say twenty-five inches; divide this by two, giving twelve and one-half inches, from which subtract three inches for the back, as shown at line E. The remaining nine and one-half inches will be the front of waist measure; mark this measure upon the bottom of the waist F, commencing from the front center line G.

Sixth, measure from under the arm down two and one-half inches to the point H, at which point place a straight edge or ruler, and draw the line I, lowering at front G one inch. This is the top dart line.

Along this line from the front G, measure three and one-half inches, which gives the point J of the first dart. Then measure three and one-half inches from this for the point J' of the second dart. Then measure off nine and one-half inches on the line F to the point K, which point mark. Then measure from line G, on the line F, one and one-half inch, for front line of first dart, then leave one-half inch interval between darts. The darts are then drafted by applying the model, fig. 3. Now allow from the nine and one-half inch mark twice the width of the darts, viz., six inches, to replace what has been taken up by same, which will bring the line F to the point L.

The garment is drafted, of course, by applying the models and marking at the several graduated scale-marks for the figures corresponding to the measurements taken, which scales are shown in the several figs. 1 and 2, there being a scale for each corresponding measurement.

It will be observed that the dart, back form, and arm-size patterns are of the ordinary shape, and adapted to be used in the usual manner in connection with the front and back patterns.

What I claim as my invention, and desire to secure by Letters Patent, is—

The front and back patterns, figs. 1 and 2, shaped and graduated as described and shown for the purpose specified.

MRS. FANNIE WETMORE.

Witnesses:
J. W. MUNDAY,
L. L. COBURN.